R. A. PEGLAR.
OVERHEAD TROLLEY.
APPLICATION FILED AUG. 16, 1911.
1,034,292.
Patented July 30, 1912.
2 SHEETS—SHEET 1.
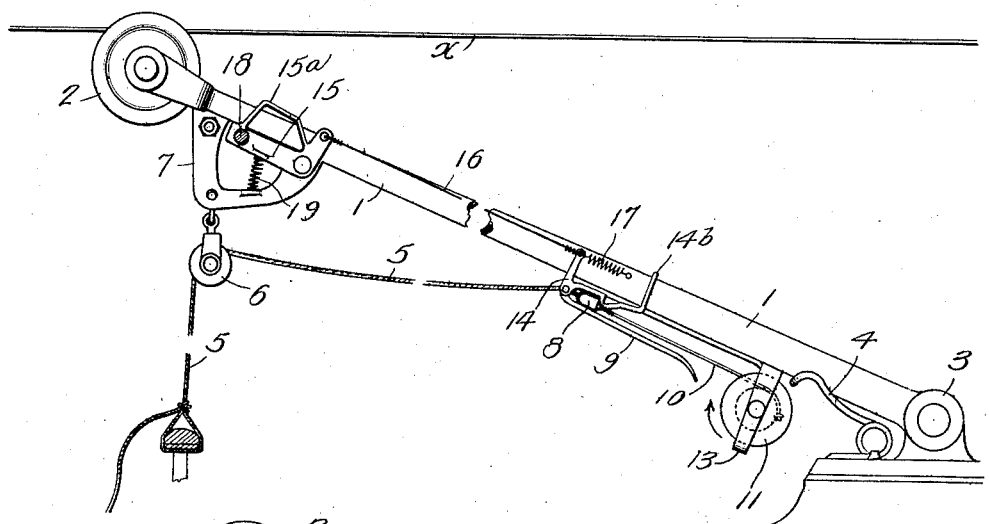
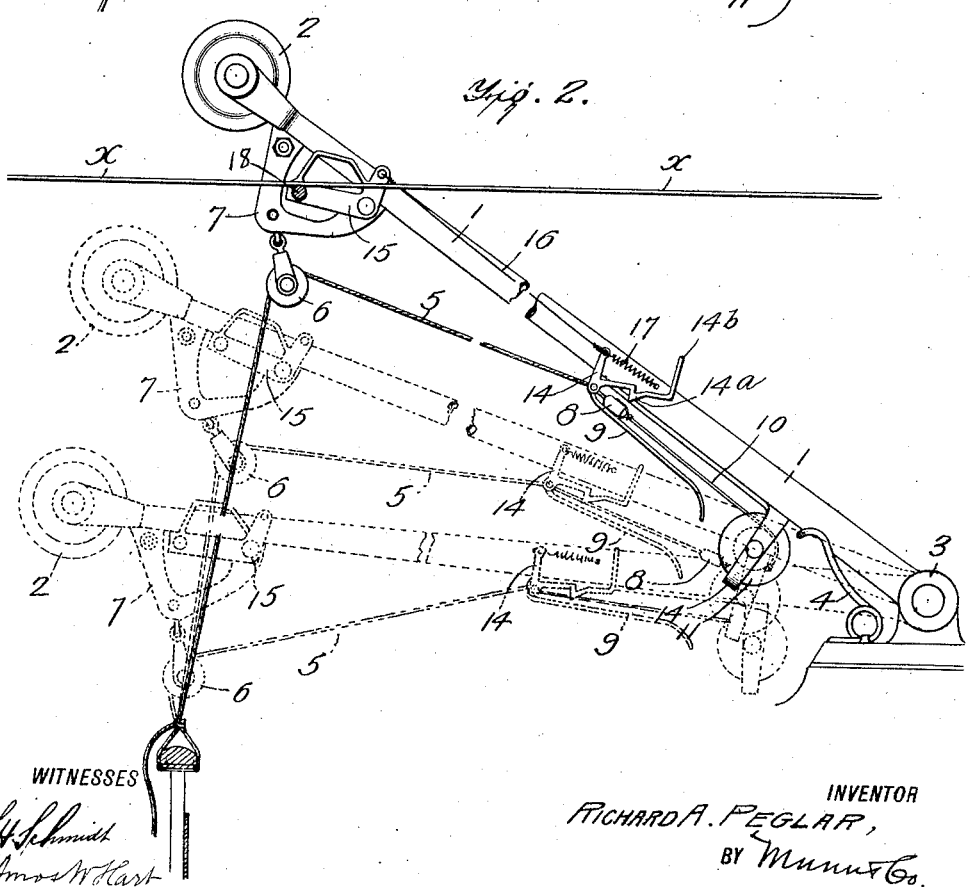
WITNESSES
INVENTOR
RICHARD A. PEGLAR,
BY
ATTORNEYS

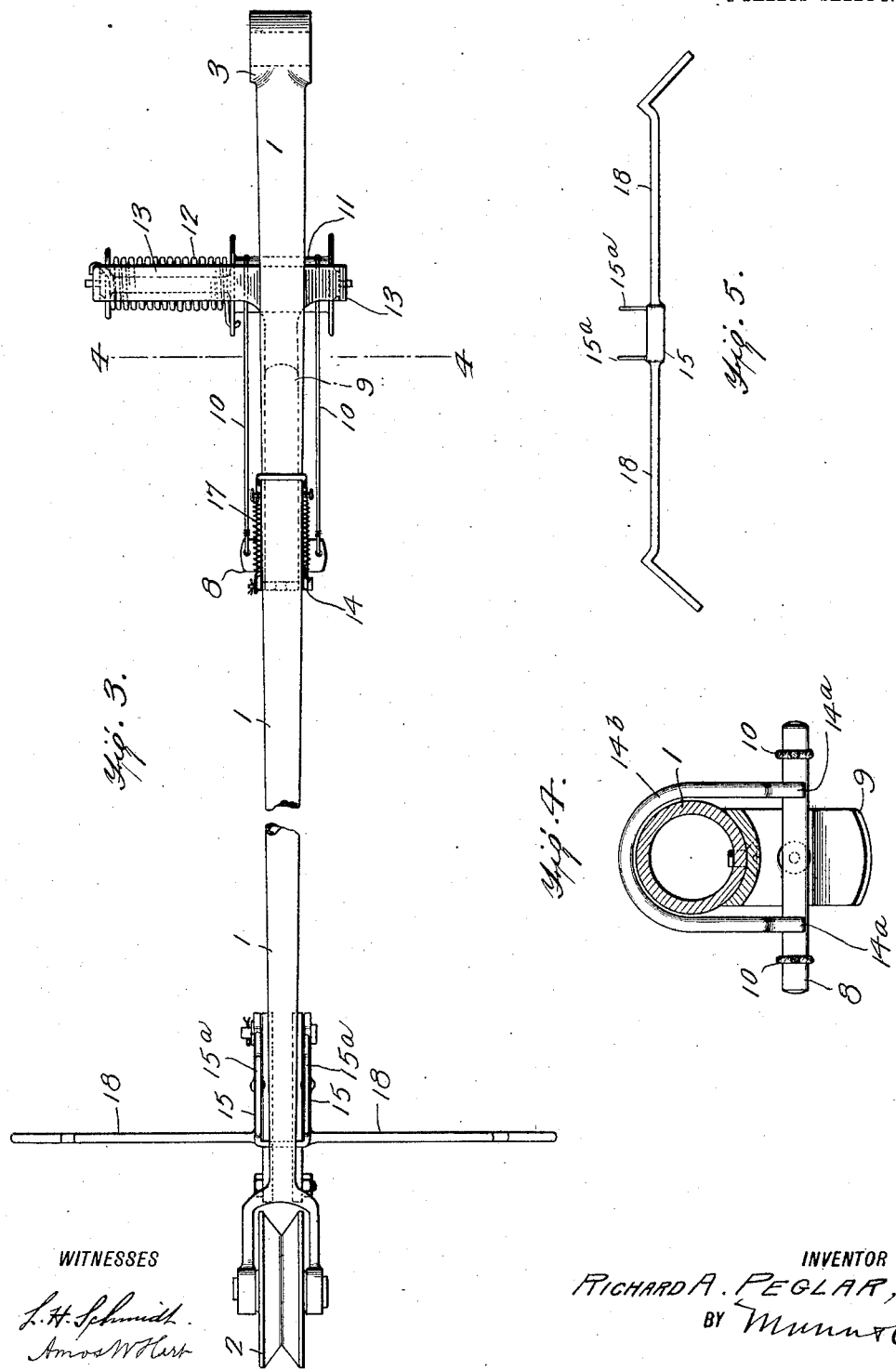

UNITED STATES PATENT OFFICE.

RICHARD A. PEGLAR, OF TORONTO, ONTARIO, CANADA.

OVERHEAD TROLLEY.

1,034,292.  Specification of Letters Patent.  Patented July 30, 1912.

Application filed August 16, 1911. Serial No. 644,406.

*To all whom it may concern:*

Be it known that I, RICHARD A. PEGLAR, a subject of the King of Great Britain, and a resident of Toronto, in the Province of Ontario and Dominion of Canada, have invented an Improvement in Overhead Trolleys, of which the following is a specification.

My invention is an attachment for overhead trolley poles, the same being designed and adapted to aid in replacing a trolley wheel on the conducting wire when the same has been accidentally displaced. The trolley rope is wound on a spring-retracted drum which is automatically released when the trolley wheel is displaced from the wire, and whereby the rope is taken up, or wound on the drum, and thus the trolley wheel is drawn down below the wire into position to be easily and quickly reapplied thereto.

The details of construction, arrangement, and operation of the invention are as hereinafter described, and illustrated in the accompanying drawings, in which—

Figure 1 is mainly a side view of a trolley pole provided with my improvement, the attachment thereto being shown in the normal position. Fig. 2 is a similar view, save that the attachment is shown in the position occupied when the trolley wheel has left the wire. Fig. 3 is a plan view of a trolley pole provided with the attachment. Fig. 4 is an enlarged cross section on the line 4—4 of Fig. 3. Fig. 5 is an edge view of the trip arms.

A trolley pole 1 carrying a grooved wheel 2, adapted to run in contact with a conductor $x$, is pivoted at 3 and provided with a supporting spring 4 in the usual way. The trolley rope 5 runs over a pulley 6 suspended from a bracket 7 attached to the pole 1, adjacent to the wheel 2, and extends back from such pulley and is attached to a short bar 8 which, as shown in Fig. 3, is arranged transversely beneath the pole and supported upon a hook 9 extending downward parallel to the pole. The said bar 8 is connected by wires or cords 10 with a flanged drum 11 which is fixed on one end of a shaft around which a spring 12 is coiled as shown in Fig. 3. The shaft and drum are supported rotatably in a bracket 13 which is attached to the under side of the pole 1 and extends transversely thereof. The spring 12 is so connected with the drum and bracket as to tend to rotate the drum in the direction indicated by arrow in Fig. 1, so as to wind the wires 10 thereon.

When tension is applied to the trolley rope 5 for setting the wheel 2 on the wire $x$, the short bar 8 will be drawn up against the upper end of the hook 9, and, obviously, in such operation, the wires 10 will be unwound from the drum, the spring 12 being wound and put under tension to a corresponding degree. When the bar 8 slides into the position indicated—see Fig. 1—it is held in place by means of a device in the nature of a latch 14, the same being pivoted to the upper end of the hook 9 and provided with shoulders $14^a$, adapted to engage the bar 8, and with a U-shaped loop $14^b$ which passes over the trolley pole. It will be understood that the pivoted end of this latch 14 is duplicated on the opposite side of the pole, so that two shoulders $14^a$ engage the bar 8 when the latch is in the locking position shown in Fig. 1. After the parts have been drawn into this normal locking position, the tension on the rope 5 being released, the latch holds the bar 8 against the resistance of the spring-retracted drum until it shall be automatically released upon the trolley wheel leaving the wire. Such release is effected by the means now to be described. The bracket 7 before referred to is approximately V-shaped and pendent from the trolley pole, and a device 15 in the nature of an elbow lever is pivoted to said bracket and its shorter arm is connected by wires 16 with the arms of the latch 14. The trip lever 15 is provided with side guides $15^a$ which embrace opposite sides of the pole 1 as shown. A spiral spring 17 is also connected with the latch, as shown, for holding it normally in engagement with the sliding bar 8 before described.

Rods 18—see Fig. 3—project laterally from the upper free end of the device 15, and together these two parts constitute a trip, which operates as follows. When the parts are in the normal position, the trip lever 15 is supported by a spring 19 in the position shown in Fig. 1, that is to say, in contact with the under side of the trolley. When, however, the wheel 2 accidentally leaves the wire $x$, the spring 4 will throw the pole upward into the position shown in Fig. 2, in which case one of the rods or lateral arms 18 will come in contact with the wire and thereby the trip lever 15 will be thrown down to the position shown in Fig. 2, whereby, through the tension thus applied by the wires 16, the latch 14 will be tripped and the short bar 8 thereby released, whereupon the spring drum will be rotated to take up the slack of the trolley rope 5, with the result that the trolley pole will be drawn down automatically to the position indicated by dotted lines in Fig. 2, so that it is in readiness to be quickly and easily applied again to the wire. In brief, whenever the trolley leaves the wire, one or the other of the arms 18 must come in contact with the latter, whereby the latch 14 is automatically tripped by the lever 15 and connected wires 16, thereby allowing the spring drum to come into action and automatically draw down the trolley pole to a position below the wire. The ends of trip arms 18 are inclined downward at an angle of about 45°, and shoulders are formed at the inner ends of the inclines, as shown in Fig. 5.

What I claim is:—

1. The combination with a spring-supported trolley pole, of a rotatable spring retracted drum, a trolley rope operatively connected with said drum so as to be taken up when the drum is rotated by its spring, a pivoted latch serving to lock the drum with the spring under tension, and a trip device connected with such latch and pivoted on the outer end of the trolley-pole and having laterally extended arms which come in contact with the wire when the trolley leaves the same, substantially as described.

2. The combination with a spring-supported trolley-pole, a trolley-rope and a guide for the latter which is applied to the outer end of the pole, a bar on the lower portion of the pole with which the trolley-rope is connected, a rotatable spring-retracted drum, a pivoted latch adapted to engage such bar, means connecting said bar with the drum, a trip device applied to the upper end of the pole and provided with lateral arms adapted for contact with the wire when the trolley leaves the same, and means connecting such trip with the latch, whereby the operation of the trip operates the latch and thereby releases the drum so that it winds up the trolley rope automatically and thus draws the trolley below the wire, substantially as described.

3. The combination with a spring-supported trolley pole, a trolley rope, and a spring retractor for the same, of a trip device comprising a part pivoted to the outer end of the pole and having lateral arms adapted to come in contact with the wire when the wheel leaves the same, and means connected with the trip and serving to normally lock the retractor and to automatically release the same when tripped, as shown and described.

4. The combination with a spring-supported trolley pole, a trolley rope and a spring actuated rotatable retractor, and means for locking the same in normal position, of a pivoted swinging trip device applied to the upper end of the pole and adapted for contact with the wire when the wheel leaves the same and connected with the retractor, whereby it is thrown downward and thus releases the retractor, substantially as described.

5. The combination with a spring-supported trolley pole, a trolley rope, a spring retracted rotatable drum, and a slidable bar to which the rope is attached, a guide attached beneath the pole upon which the said bar is adapted to slide, wires connecting such bar with the drum, a pivoted latch adapted to engage the bar and hold it normally in position for locking the retractor, and a trip connected with said latch and applied to the upper portion of the pole, substantially as described.

RICHARD A. PEGLAR.

Witnesses:
 JAS. McBRIDE,
 JEAN GORDON.

---

Copies of this patent may be obtained for five cents each, by addressing the "Commissioner of Patents, Washington, D. C."